Sept. 29, 1959 W. E. GRAY 2,906,568
SPHERICAL BEARING
Filed March 13, 1956

INVENTOR.
WARREN E. GRAY
BY
George C. Sullivan
Agent

United States Patent Office 2,906,568
Patented Sept. 29, 1959

2,906,568

SPHERICAL BEARING

Warren E. Gray, Van Nuys, Calif., assignor to Lockheed Aircraft Corporation, Burbank, Calif.

Application March 13, 1956, Serial No. 571,222

1 Claim. (Cl. 308—72)

This invention relates to spherical bearings and more particularly to a spherical bearing having a separable and split outer race.

Spherical bearings have been manufactured in the past employing a swaging process in which an outer race of soft material is formed over a spherical ball of a harder material. A spherical bearing of this conventional type employs the ball as a swaging die for the outer race. Difficulties have been encountered when employing a spherical bearing of this type due to the fact that the ball has been known to crack or to lose its spherical shape during the swaging process resulting in a break-down or damage to the structure in which the bearing is used. Because of the swaging process used, controlled tolerances cannot be maintained between the ball and the race during construction which prevents gaining maximum sphericity. The race must of necessity be composed of softer material than the ball die since the race must be pliable enough to be formed around the ball. This necessity prevents the race from being highly heat treated to provide a hardened race. Therefore, the pressures which the race can withstand are limited and thereby the application of the bearing is restricted.

These difficulties are overcome in accordance with the present invention in which a race for a spherical ball comprises a first and second ring circumferentially engageable with each other. Each ring is provided with a concave surface so that an inner spherical bearing surface is formed when the rings are joined. The concave surfaces may be contoured, such as by machining, to any desired tolerances to provide surfaces commensurate with the size and shape of the ball. In one form of the invention threads are provided internally and externally on each of the rings respectively so that the ball may be enclosed by the inner spherical surface while the rings are tightened to maintain the ball in place.

A spherical bearing constructed and employed in accordance with the present invention permits the race to be highy heat treated so that the race may be harder than the ball. Control tolerances between the ball and the race can achieve maximum sphericity since the bearing surface can be contoured to desired limits. A bearing such as contemplated by the present invention increases the lifetime of the bearing and permits the application of higher pressures to the race than when conventional swaged spherical bearings are employed.

It is an object of the present invention to provide a spherical bearing having a separable and split race for retaining the ball. This feature permits the removal of damaged or fatigued balls so that a new ball may be substituted.

It is another object of the present invention to provide a spherical bearing having an outer race composed of harder material than that of the spherical ball. Previously, the race had to be soft enough to be swaged around the ball. This requirement greatly restricts the use of spherical bearings in instances where heavy loads and pressures are encountered.

It is another object of the present invention to provide a spherical bearing having a maximum annular contact between the spherical ball and the spherical bearing surface of the race. The absence of proper annular contact distorts the ball and hampers bearing operation.

These objects and features are more clearly described and shown in the following drawings, in which.

Figure 1:
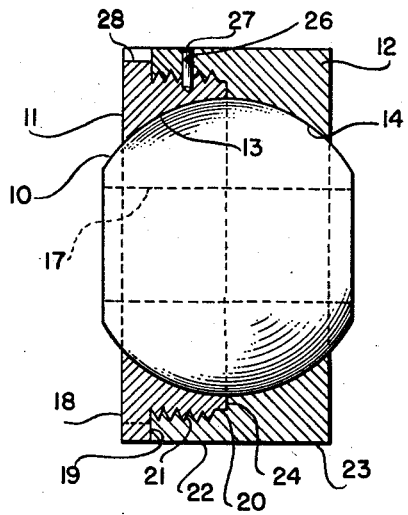
Figure 1 is a sectional view in accordance with the present invention showing the first and second ring comprising the race threadably engaged to house the ball.

Referring to Figure 1, a metal member 10 having a spherical surface is provided and is generally referred to as a spherical bearing. The member 10 is mounted in a pair of supporting rings 11 and 12 having concave surfaces 13 and 14 respectively. The concave surfaces cooperate to form a bearing surface for the member 10 and correspond to the outer surface of the spherical member 10. The employment of separable rings to form a race for the spherical bearing permits the concave surfaces to be accurately contoured, such as by machining, to receive the bearing with maximum annular contact. A transverse straight bearing 17 is provided for connection with a suitable operating mechanism (not shown).

The ring 11 has an annular flange 18 with a clamping face 19 and a male shank 20 with screw threads 21 thereon. The nut or ring 12 comprises principally a threadedly apertured female shank 22 and a base 23 with a clamping face 24. The rings are assembled by axially engaging the screw threads 21 with a threaded aperture of shank 22. The clamping faces 19 and 24 arrest axial movement by interfering with the rotary travel of shank 20 during assembly. The engagement of the shank 20 with clamping face 24 is designed to occur at approximately the apex of the outer diameter of the member 10. This feature allows the member 10 to be supported by either ring while the rings are being drawn together axially. The concave surface in ring 11 is concentrically located with respect to the concave surface located in ring 12, it being preferred that the concentricity of these elements be approximately that concentricity designed between the shank 20 and apertured shank 22.

To insure a tight fit between the rings a hole 26 is provided extending through the shanks 20 and 22 which receives a lock pin 27 for prohibiting axial movement of the rings when in use. To tighten or loosen the rings, a notch 28 is provided so that a holding tool may be inserted in the notch, thus preventing rotation of ring 11 during assembly.

Figure 2:
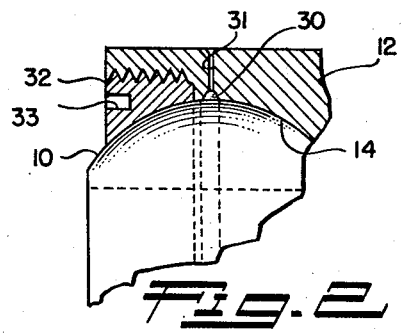
Figure 2 and Figure 3 are fragmentary sectional views illustrating means for lubricating the spherical surface of the ball.

Figure 2 illustrates means for lubricating the spherical surface of the member 10. In this embodiment, a lubricating passage 31 is provided extending through the ring 12 to the concave surface 14. An annular groove 30 extends axially about concave surface 14 so that lubricant passing through passage 31 may be distributed over the surface of member 10. Figure 2 shows a flush nut or ring 32 similar to ring 11 of Figure 1 except that flange 18 is not provided and notch 28 is replaced by a recess 33. Recess 33 is adapted to receive a holding tool (not shown) for retarding axial movement of ring 32 while ring 12 is tightened or loosened during assembly or disassembly.

Figure 3:
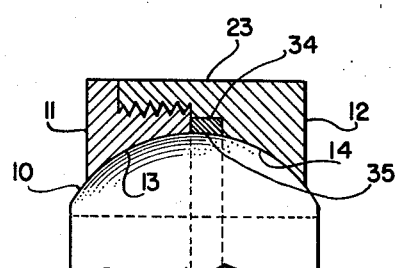

Figure 3 illustrates another means for lubricating the surface of member 10 by providing an annular groove 34 in the base 23 of ring 12. A lubricated wick 35 is provided within groove 34 which is in contact with the surface of the member 10. The wick cooperates with concave surfaces 13 and 14 to provide a continuous bearing surface for member 10. Rings 11 and 12 may be disengaged to relubricate or replace the wick.

Figure 4:
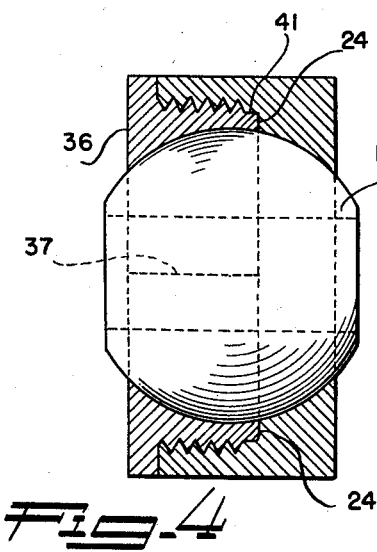
Figure 4 is a sectional view of another embodiment of the present invention showing one ring having a split for compressible engagement with the second ring.
Figure 5:
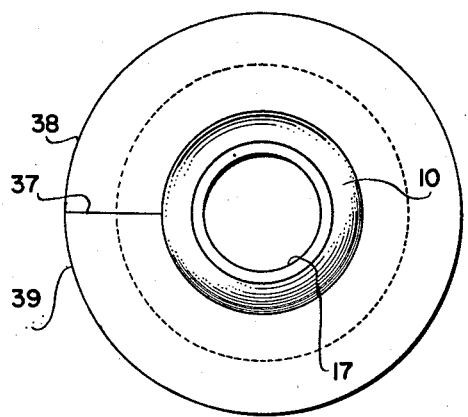
Figure 5 is a front view of the embodiment shown in Figure 4.

Figure 4 and Figure 5 illustrate another embodiment of the present invention by providing a compressible ring 36 having a longitudinal split 37 between ring ends 38 and 39. Providing a ring constructed in this manner permits a threaded shank 41 of the ring 36 to extend beyond the apex of the outer diameter of the member 10 before engaging annular clamping face 24 of the ring 12. To join the rings, ring 36 is compressed to engage the ends 38 and 39 so that the shank 41 may be received by threaded aperture of shank 22. The tendency of the ring ends to spring outwardly against shank 22 of ring 12 provides sufficient friction to overcome undesirable axial movement of the rings caused by the normal use. This feature obviates the necessity for providing a locking arrangement such as lock pin 27 shown in Figure 1.

In assembling the embodiment shown in Figure 1, the metal member 10 is held by a first ring, such as in engagement with concave surface 13 of ring 11, while the other ring, for example, ring 12, couples with the first ring. The coupling of the rings is accomplished by axially engaging screw threads 21 of shank 20 with the threaded aperture of shank 22. As the rings are axially actuated, the rings are drawn together in such a manner that member 10 engages concave surface 14 of ring 12. Further axial movement is restricted when shank 20 engages clamping face 24. At this time, concave surfaces 13 and 14 join to form a spherical bearing surface for member 10. Maximum annular contact between the member 10 and the spherical bearing surface is achieved. Lock pin 27 may be inserted in hole 26 to maintain the pair of rings in their related position. The metal member 10 is free to rotate within the confines of the rings.

Having described only a typical preferred embodiment of my invention I do not wish to be limited to the specific details herein set forth, but wish to reserve to myself any features or modifications that may fall within the scope of the following claim.

I claim:

A bearing assembly including, a spherical member of a predetermined hardness; a screw element having an annular flange portion, a threaded shank terminating with a clamping face, and a concave surface extending from the face to flange portion; a nut element having an annular base, a threaded socket for receiving the threaded shank, and a concave surface formed in the base extending from the socket to the edge of the base; the shank and socket threadably arranged so that engagement of the clamping face with the base seats the screw element in the nut element to register the concave surfaces to provide a spherical inner surface to receive and hold the spherical member; the screw element and the nut element having a hardness greater than the predetermined hardness of the spherical member; the axes of curvatures of the registered concave surfaces being on the longitudinal axis of the shank; the spherical surface being in the relation of maximum sphericity engagement with the outer surface of the member; the nut element having an annular groove opening through its concave surface and a portion of the socket; a lubricating wick situated in the groove and in constant communication with the periphery of the spherical member; and the clamping face cooperating with the groove and the socket to maintain the wick in the groove and in communication with the spherical member.

References Cited in the file of this patent

UNITED STATES PATENTS

| 409,204 | Jenkins | Aug. 20, 1889 |
| 1,020,423 | Hewitt | Mar. 19, 1912 |
| 1,677,514 | Derr | July 17, 1928 |
| 1,762,394 | Hosking | June 10, 1930 |
| 2,046,025 | Lee | June 30, 1936 |
| 2,260,283 | Halford et al. | Oct. 28, 1941 |
| 2,711,352 | Hasko et al. | June 21, 1955 |